US012622414B2

(12) United States Patent
Chitty et al.

(10) Patent No.: US 12,622,414 B2
(45) Date of Patent: May 12, 2026

(54) ANIMAL TAG

(71) Applicant: Cambridge Animal Technologies Ltd, London (GB)

(72) Inventors: Jose Chitty, London (GB); Veena Adityan, London (GB)

(73) Assignee: Cambridge Animal Technologies Ltd, London (GB)

( * ) Notice: Subject to any disclaimer, the term of this patent is extended or adjusted under 35 U.S.C. 154(b) by 264 days.

(21) Appl. No.: 18/550,848

(22) PCT Filed: Mar. 7, 2022

(86) PCT No.: PCT/GB2022/050596
§ 371 (c)(1),
(2) Date: Sep. 15, 2023

(87) PCT Pub. No.: WO2022/195252
PCT Pub. Date: Sep. 22, 2022

(65) Prior Publication Data
US 2024/0164345 A1 May 23, 2024

(30) Foreign Application Priority Data
Mar. 15, 2021 (GB) ..................................... 2103553

(51) Int. Cl.
| | |
|---|---|
| *A01K 29/00* | (2006.01) |
| *A01K 11/00* | (2006.01) |
| *A01K 13/00* | (2006.01) |
| *A61D 7/00* | (2006.01) |

(52) U.S. Cl.
CPC .......... *A01K 11/004* (2013.01); *A01K 11/002* (2013.01); *A01K 29/005* (2013.01)

(58) Field of Classification Search
CPC .. A01K 29/005; A01K 11/006; A01K 11/004; A01K 11/001
See application file for complete search history.

(56) References Cited

U.S. PATENT DOCUMENTS

| | | | |
|---|---|---|---|
| 3,304,218 A | 2/1967 | Challman | |
| 3,826,030 A | 7/1974 | Read | |
| 5,461,807 A | 10/1995 | Johnson | |
| 9,848,577 B1 | 12/2017 | Brandao et al. | |

(Continued)

FOREIGN PATENT DOCUMENTS

| | | |
|---|---|---|
| EP | 0291595 A1 | 11/1988 |
| EP | 0535665 A2 | 4/1993 |

(Continued)

OTHER PUBLICATIONS

International Search Report and Written Opinion issued Aug. 2, 2022 in corresponding International Application No. PCT/GB2022/050596.

(Continued)

*Primary Examiner* — Shin H Kim

(74) *Attorney, Agent, or Firm* — NovoTechIP International PLLC

(57) ABSTRACT

A tag for an animal is disclosed. The tag comprises a first part for permanently attaching to a part of the animal and a second, removeable part for removably attaching to the first part. The first and second parts are arranged such that the second part is releasably securable to the first part.

17 Claims, 16 Drawing Sheets

(56)                References Cited

U.S. PATENT DOCUMENTS

| | | | | |
|---|---|---|---|---|
| 9,936,676 | B1* | 4/2018 | Ulmer | A01K 11/004 |
| 11,191,626 | B1* | 12/2021 | Brandao | A01K 11/001 |
| 11,793,164 | B1* | 10/2023 | Huang | A01K 11/004 |
| 12,099,893 | B2* | 9/2024 | Kreuscher | G06K 7/10366 |
| 2018/0098521 | A1 | 4/2018 | Auer | |
| 2018/0206455 | A1* | 7/2018 | Thiex | A01K 11/008 |
| 2018/0325382 | A1* | 11/2018 | Brandao | A01K 15/023 |
| 2018/0333244 | A1* | 11/2018 | Hanks | A61B 5/7278 |
| 2019/0373857 | A1* | 12/2019 | Leigh-Lancaster | A01K 15/029 |
| 2020/0060545 | A1* | 2/2020 | Maher | A61B 5/01 |
| 2021/0153479 | A1* | 5/2021 | Mindel | G06V 40/10 |
| 2021/0195869 | A1* | 7/2021 | Florczak | A01K 11/006 |
| 2021/0204513 | A1* | 7/2021 | Florczak | A01K 11/004 |
| 2021/0212288 | A1* | 7/2021 | Smith | A01K 11/004 |
| 2022/0200519 | A1* | 6/2022 | Biffert | G01P 15/00 |
| 2022/0295753 | A1* | 9/2022 | Fedorak | A01K 39/04 |
| 2022/0369593 | A1* | 11/2022 | Vogels | A01K 11/004 |
| 2023/0270077 | A1* | 8/2023 | Lammers | A01K 19/00 119/840 |
| 2023/0404031 | A1* | 12/2023 | Chang | A01K 11/004 |
| 2024/0040993 | A1* | 2/2024 | Brauer | A01K 29/005 |
| 2024/0130327 | A1* | 4/2024 | Fregeau | H04W 4/80 |
| 2024/0164345 | A1* | 5/2024 | Chitty | A01K 11/001 |
| 2024/0245031 | A1* | 7/2024 | Eriksson | A01K 1/0023 |
| 2024/0284876 | A1* | 8/2024 | Klaas | A01K 1/0023 |
| 2024/0302479 | A1* | 9/2024 | Eriksson | G01S 5/01 |
| 2024/0315822 | A1* | 9/2024 | Jung | A61D 17/002 |
| 2024/0349702 | A1* | 10/2024 | Biffert | A01K 29/005 |
| 2024/0349703 | A1* | 10/2024 | De Samber | A01K 1/0082 |
| 2024/0407338 | A1* | 12/2024 | Biffert | A01K 29/005 |
| 2024/0415096 | A1* | 12/2024 | Kalafut | A01K 15/021 |

FOREIGN PATENT DOCUMENTS

| | | |
|---|---|---|
| EP | 3593634 A1 | 1/2020 |
| KR | 102215558 B1 | 2/2021 |
| WO | 0133950 A1 | 5/2001 |

OTHER PUBLICATIONS

Great Britain Intellectual Property Office Combined Search and Examination Report issued Aug. 16, 2021 in corresponding Great Britain Application No. 2103553.0.

* cited by examiner

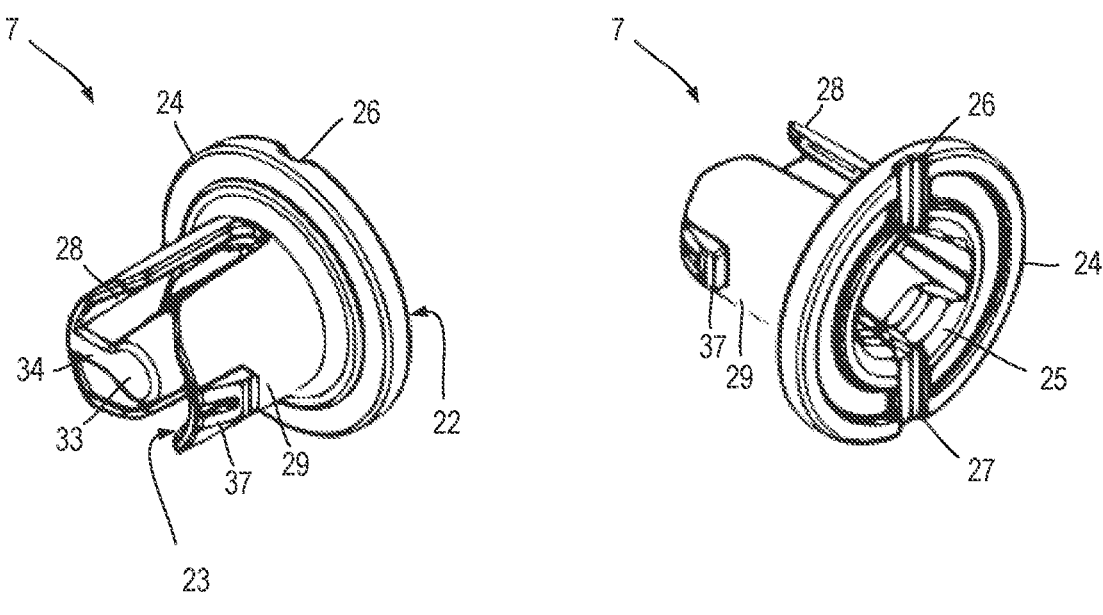
Fig. 12                    Fig. 13
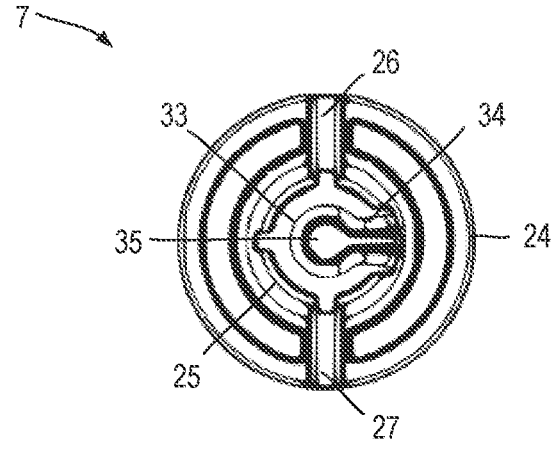
Fig. 14

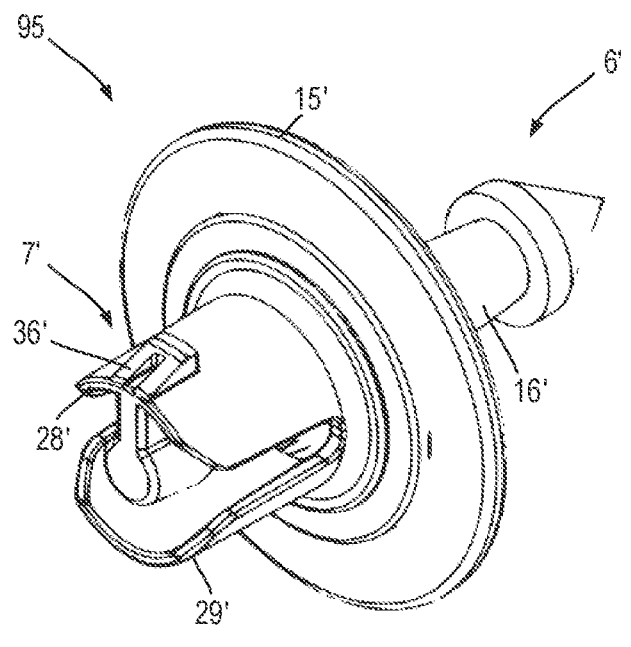
Fig. 25
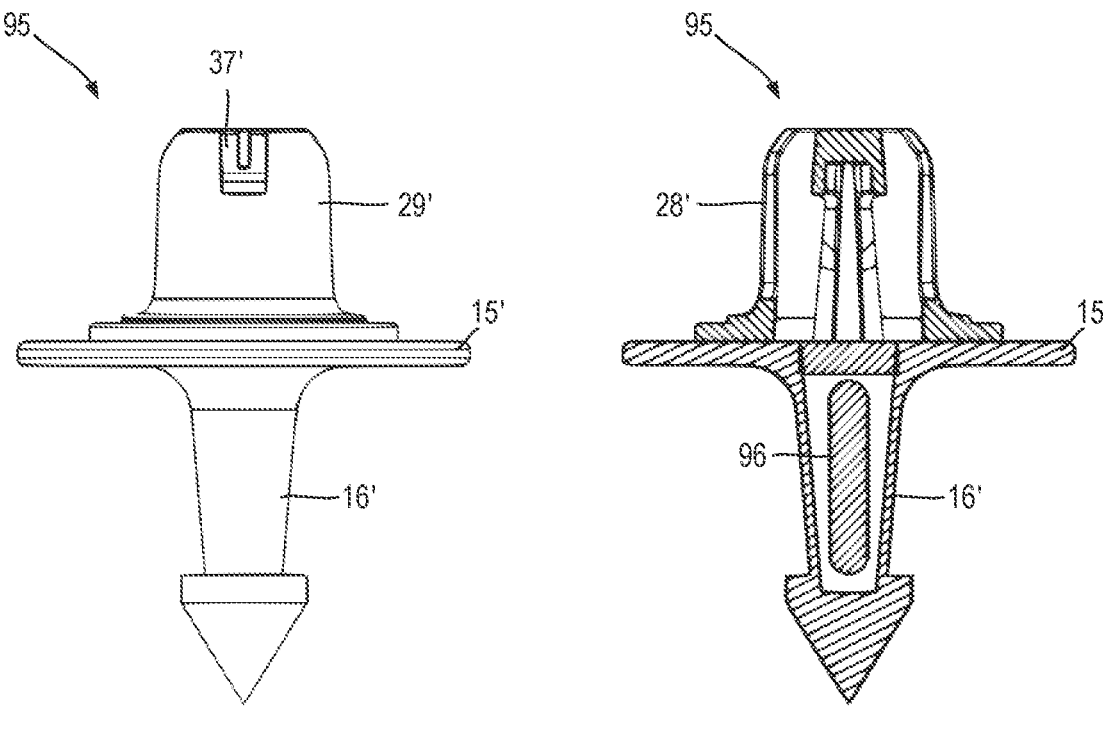
Fig. 26                    Fig. 27

43

ANIMAL TAG

FIELD

The present invention relates to a tag for an animal, such as, for example, a cow or bull, pig or sheep.

BACKGROUND

Animal identification ear tags are widely used in animal farming.

U.S. Pat. No. 3,826,030 A discloses an animal identification ear tag formed of hard plastics material, such as nylon. The ear tag comprises a male member having a tab and spike, and a female member with an aperture for receiving the head of the spike. The aperture in the female member is slightly smaller than the size of the head with the pointed tip such that the head can be forced through by the resilience of the plastics materials so as to be retained thereon after the shoulder has passed the aperture.

Electronic ear tags are becoming increasingly more common.

U.S. Pat. No. 5,461,807 A discloses animal ear tag houses a passive electronic transponder for use in the identification of the animal by a low frequency radio wave reading system. The ear tag is formed of a generally flat, flexible plastic body member includes an integral ear attaching arrangement in an upper portion and an integral, hollow half cylinder shaped cavity. The cavity is filled and sealed with an insert member that holds the electronic transponder US 2018/098521 A1 describes an animal ear tag comprising an active part which contains a battery and electronic circuit and a counter plate having a monolithically-formed spike. When the animal ear tag is fitted, the active part lies against one side of the outer ear of the animal, and the counter plate lies on the other side. The spike connects the two parts to each other, running through a passage opening in the outer ear of the animal.

These types of tags tend to be used for permanent marking and identification. However, it is also possible to mark animals temporarily. For example, U.S. Pat. No. 3,304,218 A describes a marking device capable of dispensing indicia or identifying indicia to livestock confined in, for example, sale barns and in circumstances where it is important to apply identifying means to livestock individually. Such markings can, however, be unintentionally removed, for example, by rubbing, washing or through weather erosion.

SUMMARY

According to a first aspect of the present invention there is provided a tag for an animal. The tag comprises a first part for permanently attaching to a part of an animal (such as an ear) and a second, removeable part for removably attaching to the first part. The first and second parts are arranged such that the second part is releasably securable to the first part.

Thus, the second, removeable part (which may contain a sensor system) can be affixed to the first part, but can be removed without damaging or destroying either the first or second parts. The second part, once removed, can be reused with another, different first part. Additionally, or alternatively, a new second part can be attached to the first part. The first part of tag can be used for permanent marking (or tagging) an animal and/or the second part of the tag can be used for temporary marking (or tagging) an animal.

The tag may be an ear tag for attaching to the ear of an animal. The animal may be a farm animal such as a cow, bull, steer and heifer, calf, sheep, pig or horse (or other livestock) or a bird.

The tag may further comprise a visual identification tag permanently attached to or forming part of the first part for visually and/or human-readably identifying the animal. The visual identification tag may take the form of a lobe or leaf extending from a point of attachment of the first tag. The visual identification tag may be generally flat and have a planar area of between 4 cm² to 50 cm².

The tag may further comprise a machine-readable identification tag permanently attached to or forming part of the first for machine-readably identifying the animal. The machine-readable identification tag may be an RFID tag. The machine-readable identification tag may be a barcode.

The first part may comprise a first portion, such as a stud, and second portion, such as a stud back. The stud and stud back may be configured to snap-fit inseparably. The stud back may comprise a base and a spike upstanding from the base, the spike comprising a shaft and an arrow head and the stud comprises an annular portion and one or more members inwardly-projecting from the annular portion such that in response to the head passing in a first direction beyond the one or more inwardly-projecting members, the inwardly-projecting members prevent the spike from being withdrawn past the inwardly-projecting members in a second, opposite direction.

The first portion may comprise a base and a spike upstanding from the base, the spike comprising a shaft and an arrow head. In other words, the stud may also include the spike for inseparably snap-fit with another female mating portion, for permanently securing the stud to the animal.

The first part may include at least one male mating member and the second part comprise at least one corresponding female mating part. The at least one male mating member and the at least one corresponding female mating part may be configured to snap-fit separably. The at least one male mating member may comprise a resilient member supporting a protrusion and the corresponding female mating part may comprise a depression for receiving the protrusion. The at least one male mating member may comprise at least one resilient side wall supporting a barb and the at least one female mating member may comprise a side wall comprising a slot or notch for receiving the barb. The first part may include two male mating members and the second part may comprise two corresponding female mating parts.

The first part may comprise an annular base, first and second facing arcuate walls extending away the annular base and first and second protrusions extending outwardly laterally. The second part may comprise a tube having first and second slots on opposite sides of the tube for receiving the protrusions. The slots may be open at one end, i.e., the slots may be notches extending from one end of the tube.

The first part may comprise first and second resilient members for cooperating with corresponding parts on the second portion for releasably securing the second part to the first part, the first and second resilient members arranged such that in response to the first and second resilient members being urged inwardly and sufficiently close together, the first and second parts are released and first and second apertures for receiving first and second correspondingly shaped parts of a tool for inwardly urging the first and second resilient members. The first and second resilient members may be first and second facing arcuate walls. The first and second resilient members may include respective first and second protrusions extending outwardly laterally.

The first part may comprise a wall between the first and second apertures for discouraging or preventing the tool from urging the first and second resilient members too closely.

Thus, the gap between the first and second parts of the tool may not be less than a predetermined distance.

The second, removeable part may comprise a connector for removably attaching the second, removeable part to the first part of the tag, a main tag portion and a tab joining the connect and the main tag portion. The tab may be formed of a sufficiently flexible material to be bendable such that the main tag portion is foldable by an angle of at least 90 degrees towards to the connector from a first angular position to a second angular position. In the first position, the tag is flat and the connector and main tag portion are substantially coplanar. The connector and main tag portion may be bent as far as between 90 and 180 degrees or more. The tab may be sufficiently flexible to be twistable by at least 90 degrees. The second position may be such that in the second position, the tag may be fully bent back so that the connector lies against the main tag portion.

The main tag portion may comprise a housing and a sensor system and a battery contained in the housing of the main tag portion. The sensor system may include a temperature sensor for sensing animal temperature and a wireless network interface, for example, to transmit sensed data and/or to receive instructions and/or updates. The housing is preferably fluid tight.

The temperature sensor may be an infrared sensor and the housing may include a window which is transparent to infrared radiation. Thus, the sensor is about to measure the temperature of the animal The sensor system may further include an accelerometer, a gyroscope and/or a further temperature sensor for sensing ambient temperature. The sensor system may further include a positioning unit, such as a GPS unit. The sensor system may further include a further temperature sensor for sensing ambient temperature, a heart rate monitor, a magnetometer, and/or an energy harvesting unit.

According to a second aspect of the invention there is provided a tool adapted to release the second part from the first part.

The tool may comprise first and second arms having first and second tips, and first and second stubs protruding from inwardly-facing surfaces of the first and second arms.

The first and second stubs may be positioned and dimensioned so as to engage the first and second apertures respectively of the tag. The tool may further comprise first and second engagement surfaces disposed on the inwardly-facing surfaces of the first and second arms. The first and second engagement surfaces may be positioned and dimensioned so as to engage with the first and second resilient members and to urge the first and second resilient members inwardly.

The first and second engagement surfaces may slope outwardly towards the ends of the arms. This can help separate the first and second parts.

According to a third aspect of the present invention there is provided a system comprising the tag of the first aspect of the invention and the tool of the second aspect of the invention.

According to a fourth aspect of the present invention there is provided a method comprising permanently attaching a first part of a tag to a part of an animal, attaching a second part of the tag to the first part, wherein the first and second parts are arranged such that the second part is releasably secured to the first part, and detaching the second part of the tag from the first part.

The method may further comprise attaching the second part of the tag to the first part of another, different tag. The method may comprise attaching another, different second part of the tag to the first part.

The second part of the tag may include a sensor system which includes a temperature sensor and a wireless network interface.

The method may comprise using the tool of the second aspect to detach the second part of the tag from the first part.

BRIEF DESCRIPTION OF THE DRAWINGS

Certain embodiments of the present invention will now be described, by way of example, with reference to the accompanying drawings, in which:

FIG. 12 is a perspective view of the stud shown in FIG. 8;

FIG. 13 is another perspective view of the stud shown in FIG. 8;

FIG. 14 is a bottom view of the stud shown in FIG. 8

FIG. 25 is a perspective view of a modified stud which includes both a stud for separably snap-fitting with a stud cover and a spike for inseparably snap-fitting with a corresponding female part;

FIG. 26 is a side view of the modified stud shown in FIG. 25;

FIG. 27 is a cross-sectional view of the modified stud shown in FIG. 26;

DETAILED DESCRIPTION OF CERTAIN EMBODIMENTS

Figure 1:
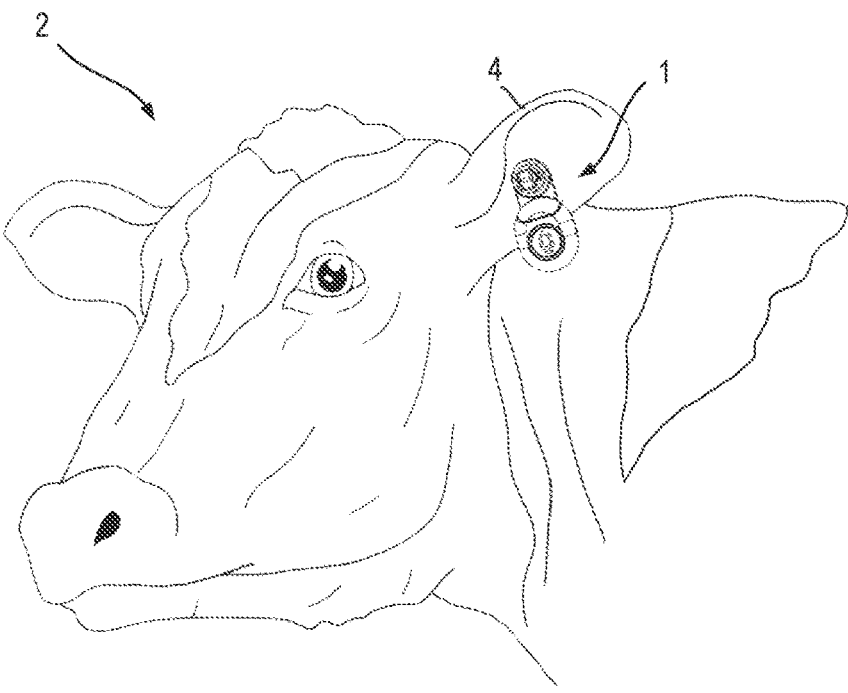
FIG. 1 is a perspective view of a cow wearing an ear tag in its outer ear.
Figure 2:
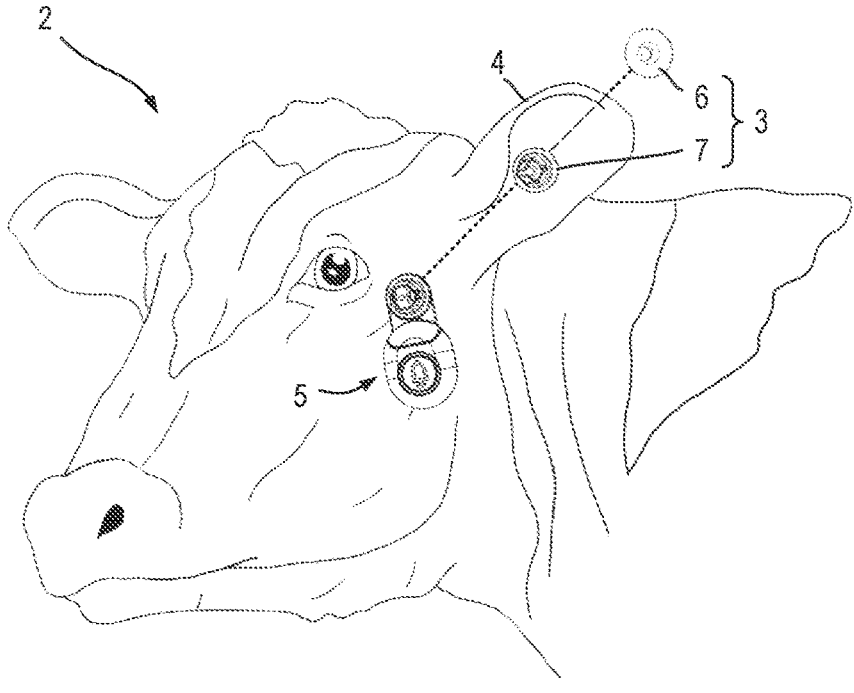
FIG. 2 is a perspective, exploded view of the ear tag shown in FIG. 1.

Referring to FIGS. 1 and 2, a tag 1 for an animal 2, which in this case is a cow, is shown.

The tag 1 includes a stud assembly 3 (herein also referred to as a "a first part", "fixed part", "fixed attachment" or "dock") that is permanently attached to a suitable part 4 of the cow 2, in this case the ear, and a second part 5 (herein also referred to as a "removeable part", "removeable attachment" or "removable tag") that can be removably attached to the stud assembly 3.

The stud assembly 3 comprises first and second stud parts 6, 7, herein referred to as the "stud back" and "stud", respectively, which sandwich and are joined through the ear 4. The stud back 6 and stud 7 are separate pieces which are fastened for example, by inseparable snap-fit, to form a unit which is permanently attached to the cow 2. Once the stud assembly 3 is attached, the removable part 5 can be attached to the stud assembly 3.

Figure 3:
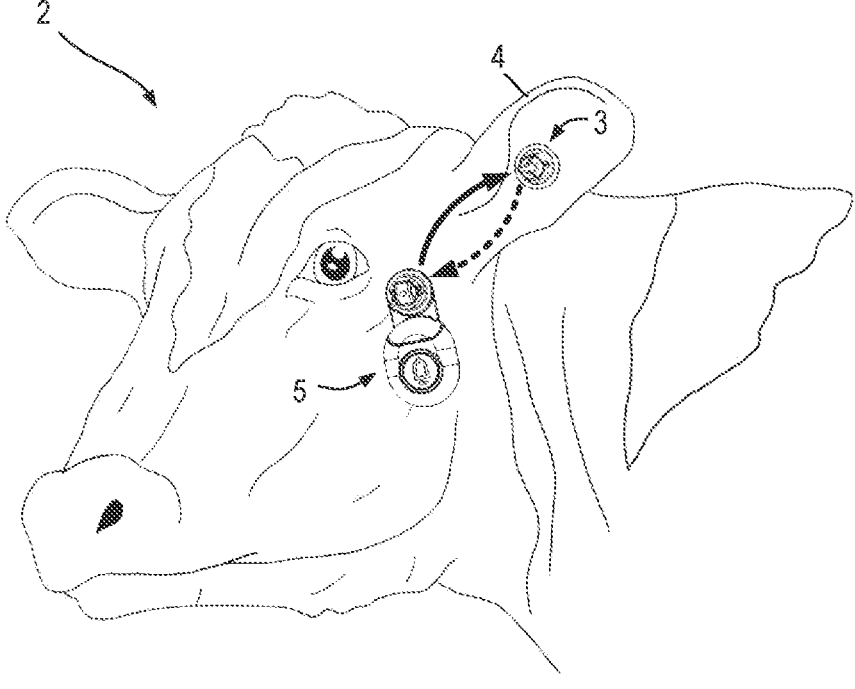
FIG. 3 illustrates attaching and detaching a removable part of an ear tag to and from a stud assembly.

Referring also to FIG. 3, the fixed and releasable parts 3, 5 of the tag 1 are arranged such that the removeable part 5 is releasably securable to the fixed part 3 (i.e., the stud assembly). In other words, the removeable part 5 can be affixed to the fixed part 3 (i.e., the stud assembly), but can be removed without damaging or destroying either the fixed or removeable parts 3, 5. The removeable part 5, once removed, can be reused with another, different stud assembly that is attached to a different cow. Additionally, or alternatively, a new removeable part 5 can be attached to the stud assembly 3. As will be explained in more detail hereinafter, a tongs-like tool 9 (FIG. 23) can be used for releasing the removeable part 5.

The arrangement can be used to provide a permanent identifiable mark for livestock. Additionally, or alternatively, the arrangement can be used to provide a temporary identifiable mark that cannot be unintentionally removed, for example, through wear, washing, or weather). The temporary mark can, however, can be removed through intentional release action, for example, using a specific tool.

Figure 4:
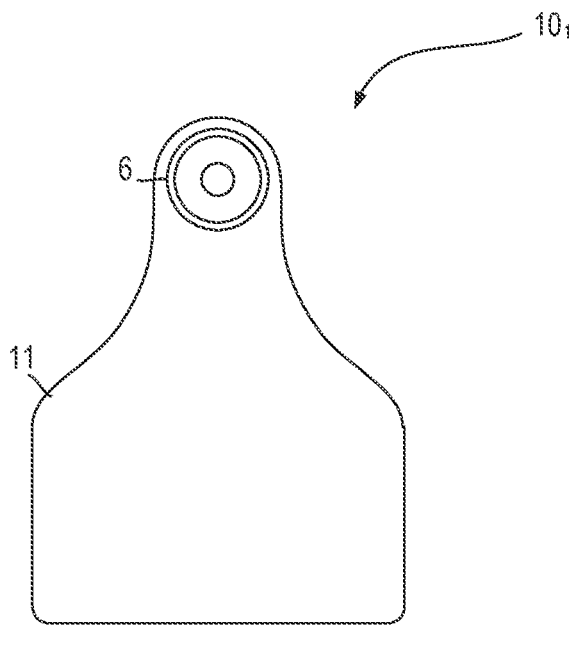
FIG. 4 is a plan view of a first type of identification tag which can be incorporated into the ear tag shown in FIG. 1.
Figure 5:
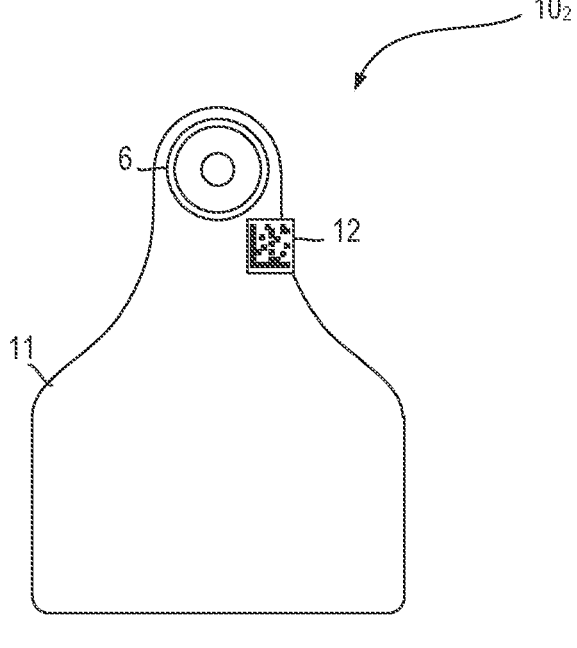
FIG. 5 is a plan view of a second type of identification tag which can be incorporated into the ear tag shown in FIG. 1.

Referring also to FIGS. 4 and 5, the tag 1 may further include an identification tag $10_1$, $10_2$ which is permanently attached to or integrally forms part of the stud assembly 3.

In one form, the identification tag $10_1$ takes the form of a sheet-like leaf or lobe 11 which depends from the std back 6 and includes text or symbols (not shown) for visually and/or human-readably identifying the cow 2. The leaf or lobe 11 is generally flat and sufficiently large (for example, having an area of between 4 cm² to 50 cm²) to allow text or symbols (not shown) displayed on the leaf or lobe to be readable by a human.

In another form, the identification tag $10_2$ includes a machine-readable identification tag 12 for example in the form of a barcode (such as a two-dimensional barcode) and/or a radio frequency identification (RFID) tag. The identification tag $10_2$ may also include a visual identification tag 11.

Referring to FIGS. 6 to 18, the tag 1 is shown in more detail.

Figure 6:
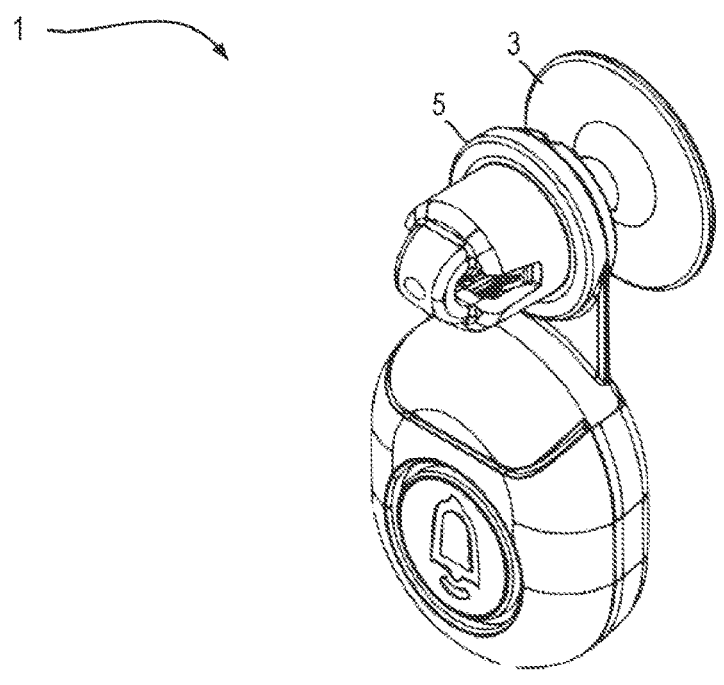
FIG. 6 is a perspective view of the ear tag shown in FIG. 1.
Figure 7:
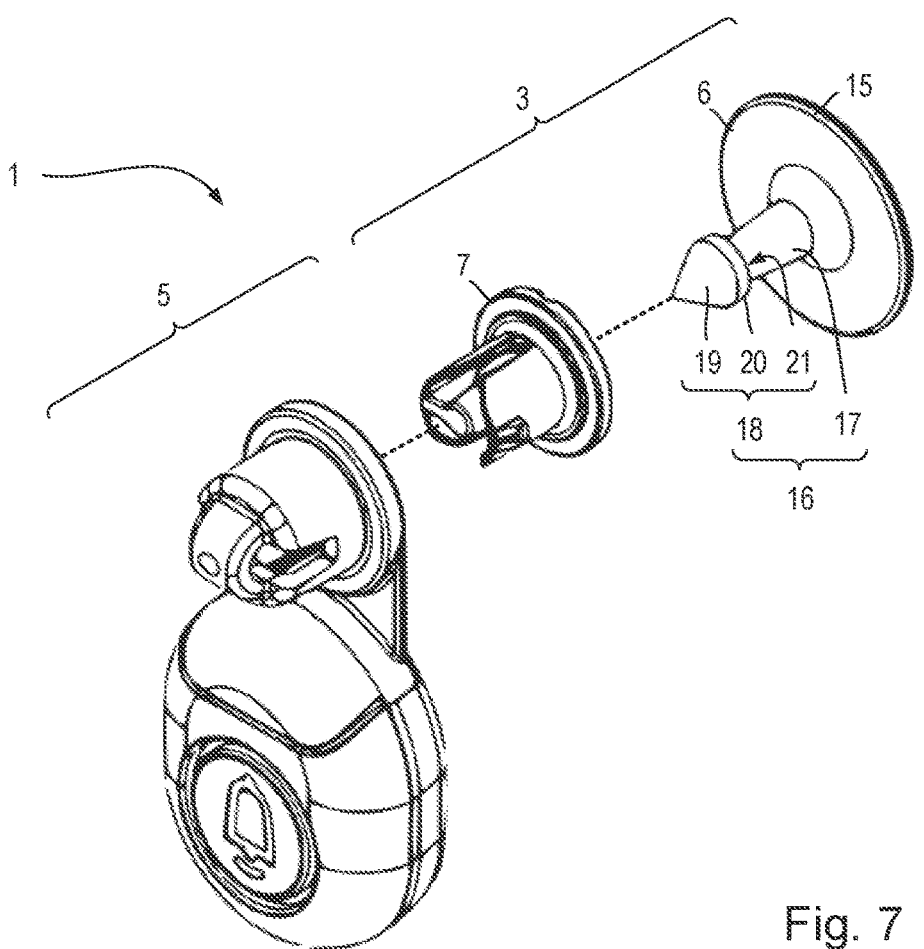
FIG. 7 is a perspective, exploded view of the ear tag shown in FIG. 6.
Figures 8, 9:
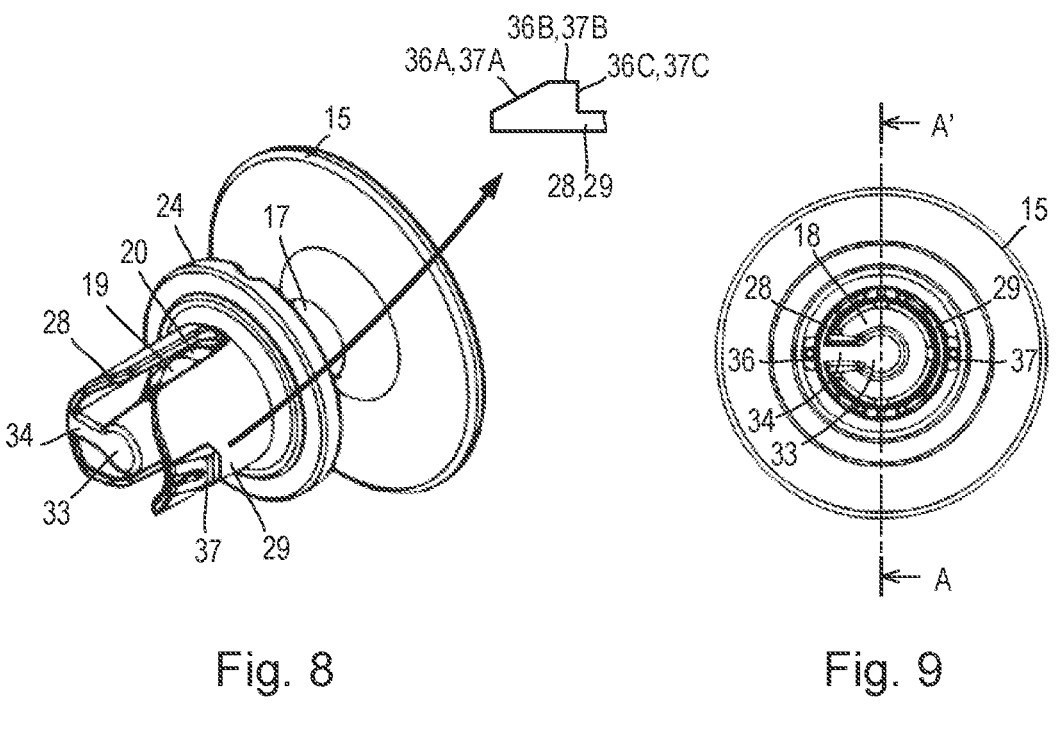
FIG. 8 is a perspective view of a stud assembly shown in FIG. 7 which is permanently attached to the animal and which includes a stud back and a stud.
FIG. 9 is a top, plan view of the stud assembly shown in FIG. 8.
Figures 10, 11:
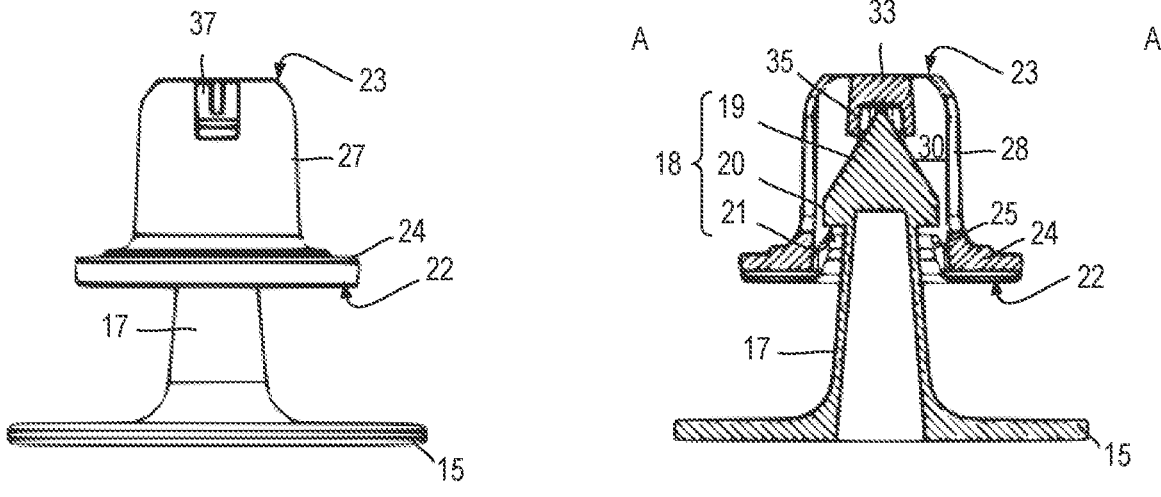
FIG. 10 is a side view of the stud assembly shown in FIG. 8.
FIG. 11 is a cross-sectional view of the stud assembly shown in FIG. 8.

Referring in particular to FIG. 6, when assembled, the tag 1 has a lobed appearance in which the removeable part 5 depends from the stud assembly 3.

Referring in particular to FIGS. 7 to 16, the stud back 6 generally comprises a base 15, in this case in the form of a disc, and a spike 16 (or "pin") upstanding from the centre of the base 15 having a shaft 17 and an arrow head 18 comprising a pointed conical tip 19, a short cylindrical section 20 and an annular underside 21 (or "barbed edge" or "surface").

The stud back 6 is formed of a suitable hard plastic material, such as nylon or high-density polyurethane (HDPE). The stud back 6 may include a hardened tip, for example, formed of stainless steel.

The stud 7 takes the form of thimble-like structure which is generally cylindrically-shaped and which has first and second ends 22, 23.

At its first end 22, the stud 7 comprises an annular plate 24 and a resilient inwardly-projecting rim 25 (or "shelf") (best shown in FIG. 11) for interfering with the underside 21 of the head 18 such that the head 18 cannot be withdrawn once it has passed beyond the rim 25.

Referring in particular to FIGS. 13 and 14, the annular ring 24 also includes first and second radial grooves 26, 27 (or "channels") which can allow dirt and/or sweat to escape.

Referring in particular to FIGS. 8 to 14, between the first and second ends 22, 23, first and second curved opposite resilient side walls 28, 29 (or "wings" or "fins") extend away from the annular plate 24 towards the second end 23 defining a generally cylindrical cavity 30. The first and second curved side walls 28, 29 face each other and define first and second longitudinally-orientated slots 31, 32. As will be explained in more detail hereinafter, the arrangement of the side walls 28, 29 and slots 30, 31 allow the side walls 28, 29 to bend inwardly, towards each other, when pressed together.

At its second end 23, the stud 7 comprises a central end stop 33 disposed on a flanking arm or fin 34 extending from the inside of the first side wall 28. The end stop 33 has a blind hole 34 for receiving and seating the head 18 of the spike 16 when the head 18 is inserted into the cavity 30. The stud 7 also comprises first and second opposite wedge-like barbs 36, 37 (or "hooks" or "protrusions") on the outside of the first and second side walls 28, 29 thereby providing locking wings. Each barb 36, 37 has an entrance side 36A, 37B, an optional land length 36B, 37B and a retraction side 36C, 37C. The retraction side 36C, 37C preferably has a return angle to prevent disengagement (or "disassembly"), for example, substantially 90 degrees.

The stud 7 is formed of a suitable hard plastic material, such as nylon.

Figure 15:
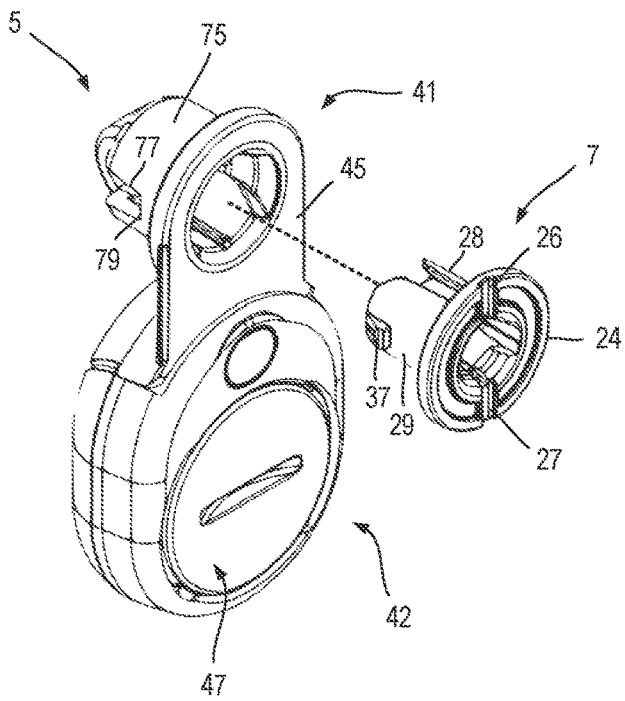
FIG. 15 is a perspective view of the stud shown in FIG. 12 and a removeable tag which includes a stud cover.
Figure 16:
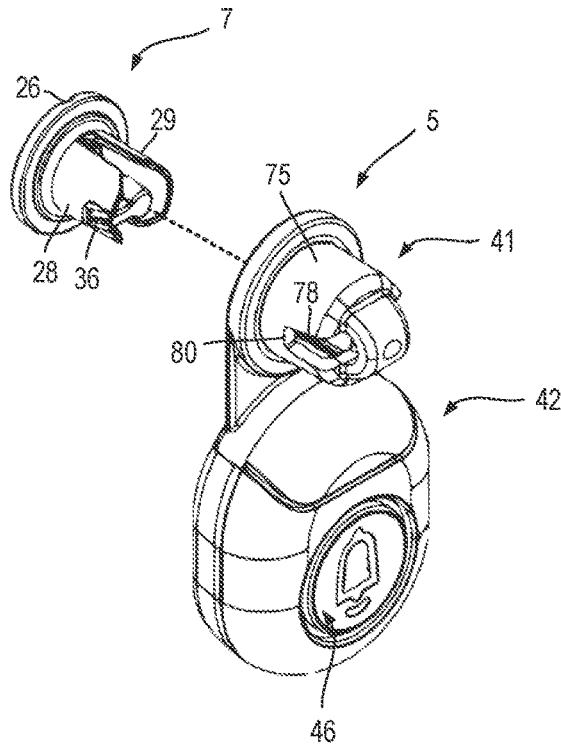
FIG. 16 is another perspective view of the stud and the removeable tag shown in FIG. 15.
Figure 17:
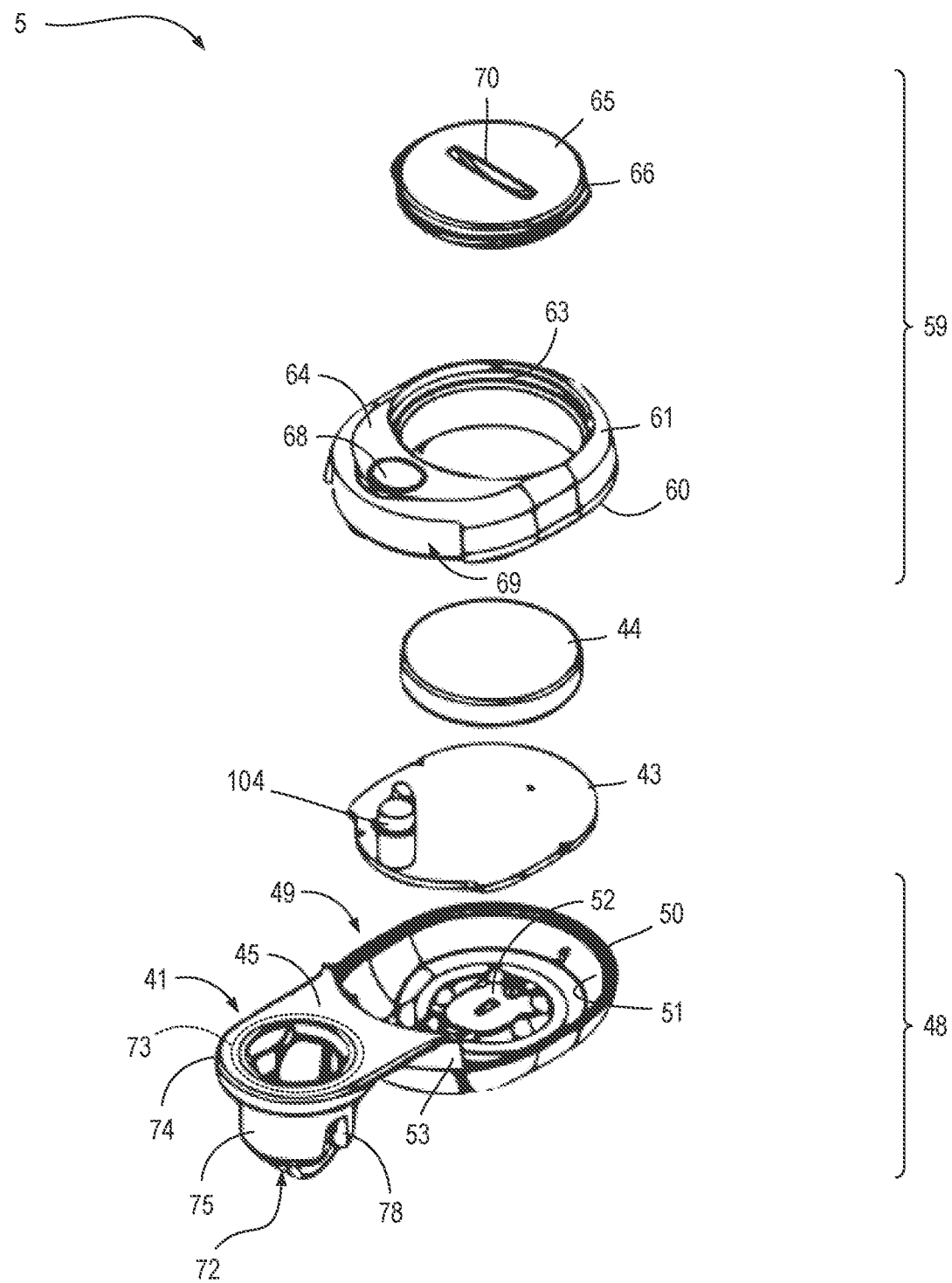
FIG. 17 is a perspective exploded view of the removeable part of the ear tag shown in FIG. 15.

Referring in particular to FIGS. 15 to 17, the removeable part 5 includes a stud cap 41 (or "connector") for receiving and securing the stud 7 and a main tag portion 42 (or "sensor tag"), which houses a sensor system 43 including a battery 44. The stud cap 41 and main tag portion 42 are joined by a flexible tab 45.

The main tag portion 42 is generally spherocylindrical shaped (or "capsule shaped") having first and second, opposite, generally flat faces 46, 47.

Figure 18:
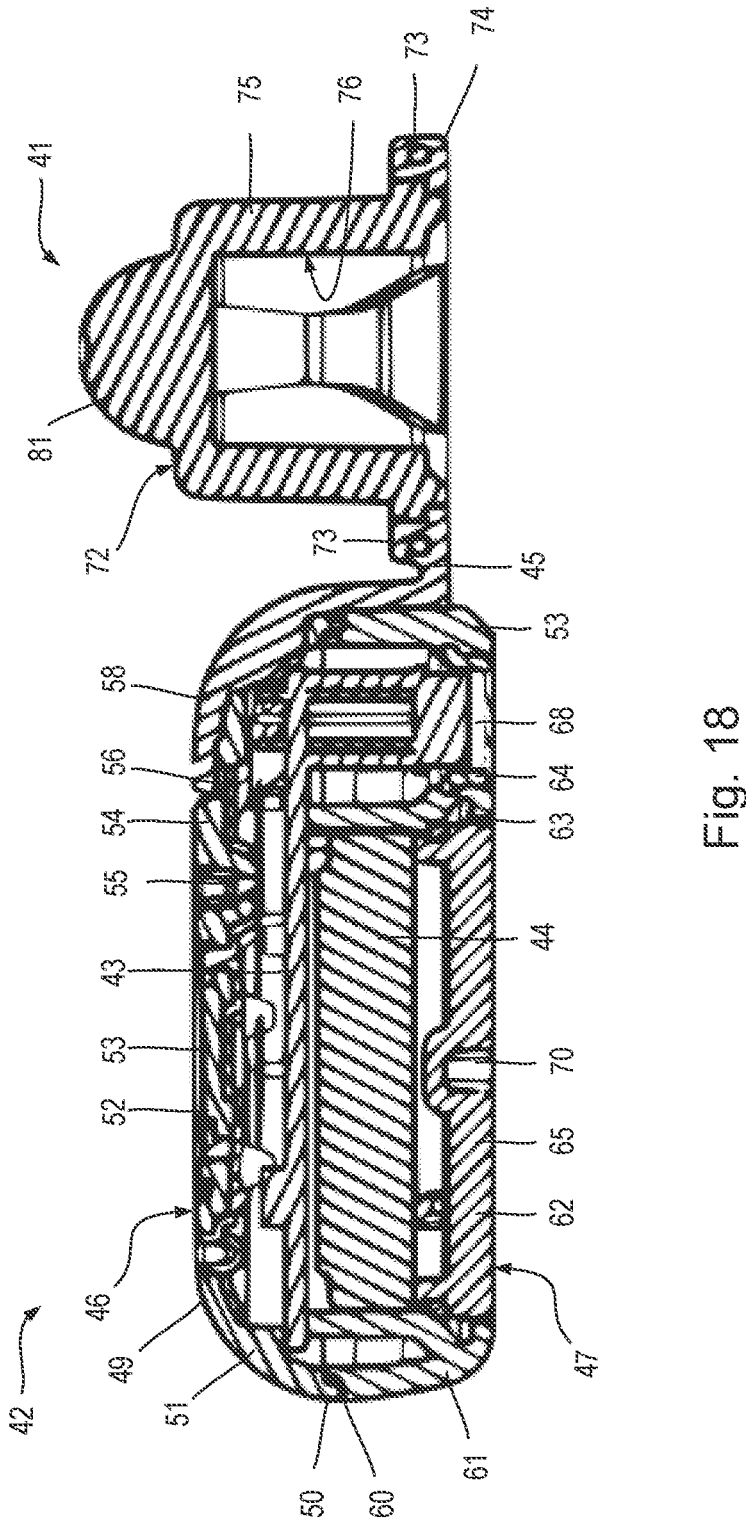
FIG. 18 is a cross-sectional view of the removeable part of the ear tag shown in FIG. 15.
Figure 19A:
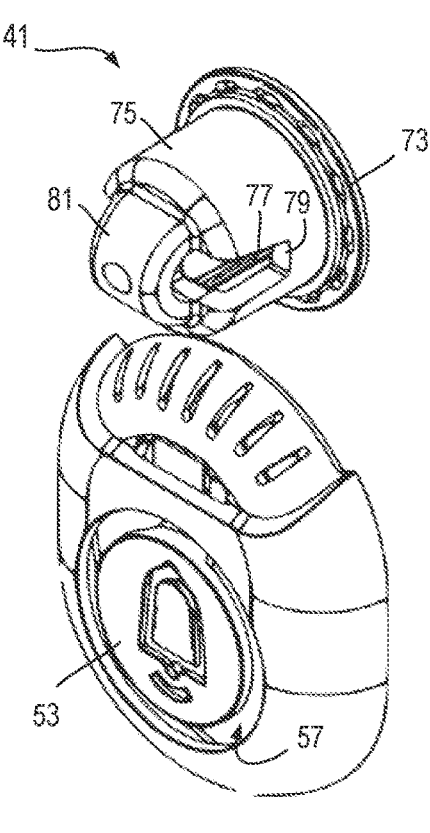
FIGS. 19A and 19B are perspective views illustrating manufacture of a first part of a removable ear tag using overmoulding.
Figure 19B:
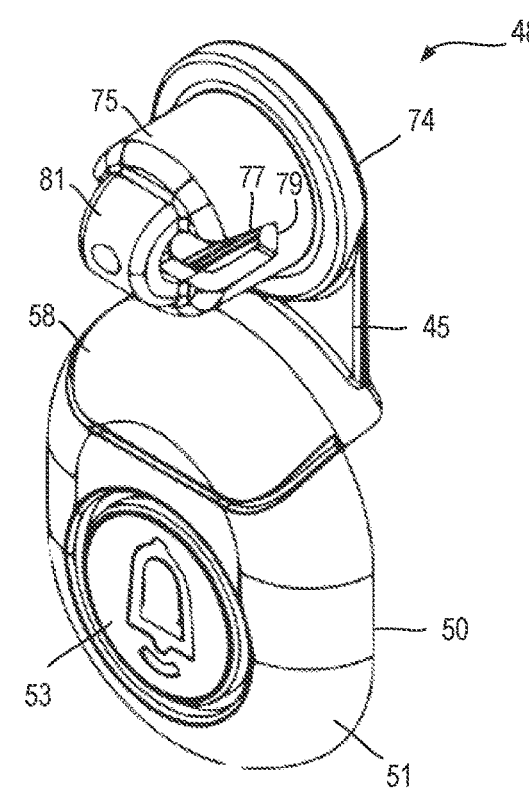

Referring in particular to FIGS. 17 and 18, the removeable part 5 comprises a multi-piece assembly which includes a first, main portion 48 which includes the stud cap 41, the flexible tab 45 and a first housing portion 49 of the main tag portion 42.

Figure 20A:
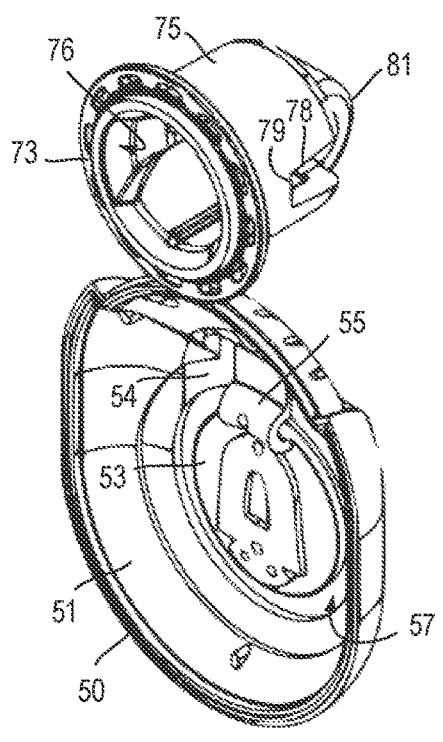
FIGS. 20A and 20B are further perspective views illustrating manufacture of a first part of a removable ear tag using overmoulding.
Figure 20B:
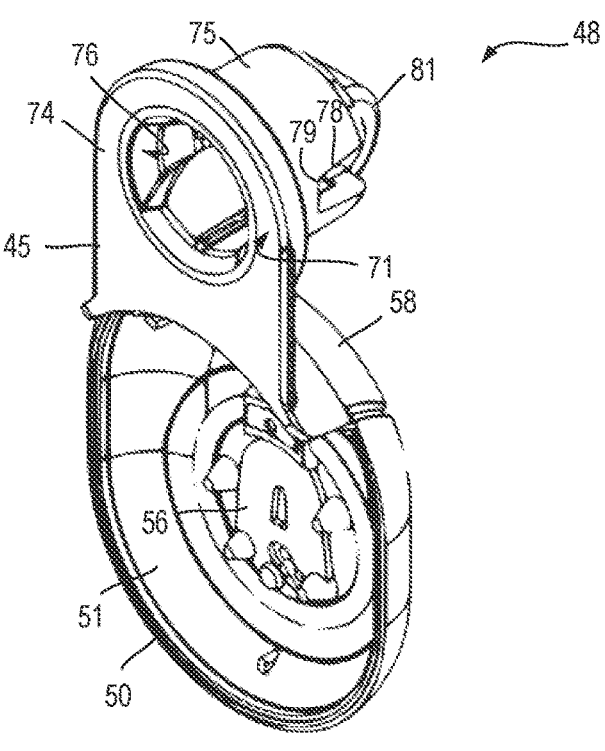

The first housing portion 49 is generally concave (or "shallow bowl-shaped") having a generally stadium-shaped perimeter edge 50, a curved side wall 51 extending away from the edge 50 towards a generally flat wall 52. The wall 52 includes a circular disc 53 which provides a push-button, a crescent-shaped wall piece 54, a living hinge 55 between the disc 53 and the crescent-shaped wall piece 54 and first flexible layer portion 56 (or "overmould layer portion") which covers the inside face of the disc 53 and bridges an annular gap 57 (best shown in FIG. 20A) around the circular disc 53. The disc 53 and crescent-shaped wall piece 54 together are stadium-shaped in plan view and provide the first flat face 46 of the sensor tag 42.

At one end of the first housing portion 49, the first flexible layer portion 56 crosses and extends beyond the plane of the perimeter edge 50 to form a second flexible layer portion 58 (or "flexible arcuate tab") which turns into the flexible tab 45.

The assembly includes a second portion 59 which serves as a second housing portion of the main portion 42.

The second housing portion 59 is generally concave having a generally stadium-shaped perimeter edge 60 and a curved side wall 61 extending away from the edge 60 towards a generally flat wall 62. The wall 62 has a first, large threaded circular aperture 63 leaving a crescent-shaped wall portion 64 for receiving a circular cover 65 having a correspondingly-threaded peripheral edge 66 such that the cover 65 can be screwed into (for example, by a quarter turn) and secured in the aperture 63. The crescent-shaped wall portion 64 and cover 65 together are stadium-shaped in plan view, and provide the second flat face 47 of the sensor tag 42. The crescent-shaped wall portion 64 includes an oval aperture 67 which is filled with a window 68. As will be explained in more detail later, the window 68 is transparent at infrared wavelengths and can be used for temperature sensing, heartrate monitoring and/or other sensing employing infrared signals. The window 68 is made of high-density polyethene (HDPE).

At one end of the second housing portion 59, the perimeter edge 60 crosses the plane of the perimeter to the level of the wall 62 to form arcuate cut-out 69 which complements the arcuate tab 58. The cover 65 includes a blind slot 70 into which the tool (FIG. 23) or a coin can be inserted and turned so as to unscrew and release the cover 65.

The first, second housing portions 49, 59 and cover 65, when assembled, form a fluid-tight housing for the sensor system 43.

Referring in particular to FIGS. 15 to 22, the cap cover 41 is generally cylindrically-shaped and has first and second ends 71, 72. The cover 41 includes a flange 73 which overmoulded with an annular flexible portion 74 which forms a single piece with the tab 45.

A tube 75 extends from the flange 73 to the second end 72. The tube 75 has an inner surface 76 and first and second notches 77, 78 extending longitudinal from the second end 72. The notches 77, 78 have first and second ends 79, 80 for interfering with the wedge-like barbs 36, 37 (FIG. 12) on the cap 7. The connector includes an arch 81 over the second end 72 of the cap cover and a depending short curtain 82 (or "wall" or "spacer"). As will be explained in more detail herein after, the curtain 82 is orientated and has a thickness d to provide protection against over-travel of the arms of the tool.

The tab 45 and flexible layer portions 56, 58, 74 are made from a suitable flexible plastic material, such as thermoplastic elastomer (TPE). The cap cover 41 and the sensor tag housing is made of a suitable hard plastic material, such as a blend of polycarbonate (PC) and acrylonitrile butadiene styrene (ABS).

Figure 21:
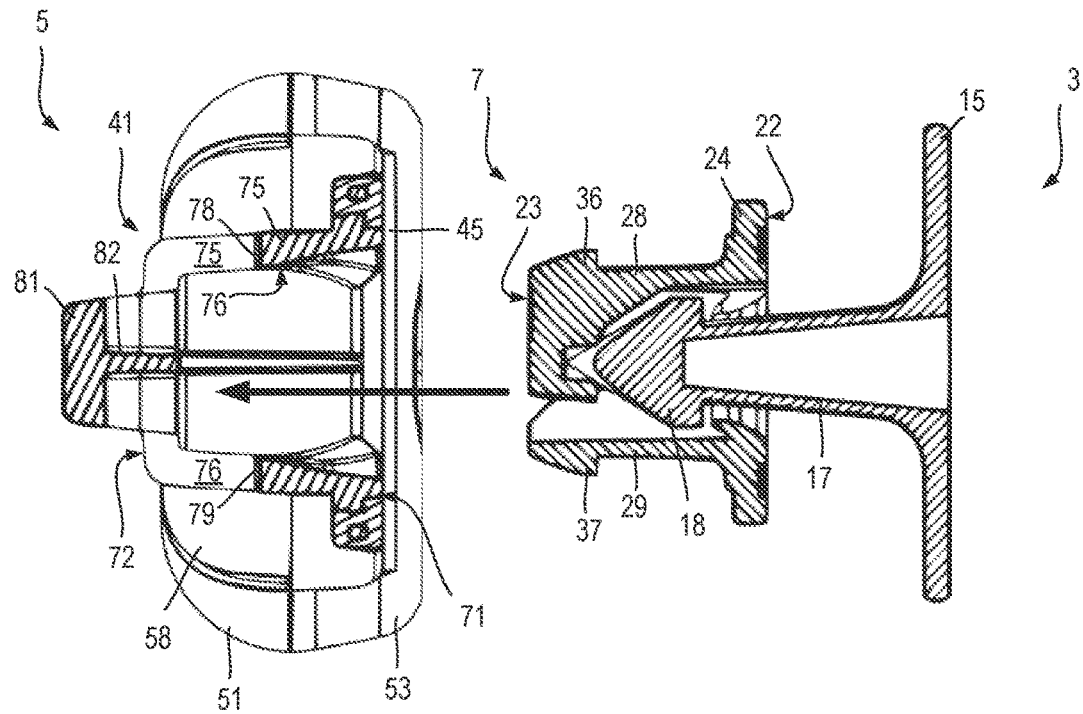
FIG. 21 illustrates a stud cover and a stud before insertion of the stud into the stud cover.
Figure 22:
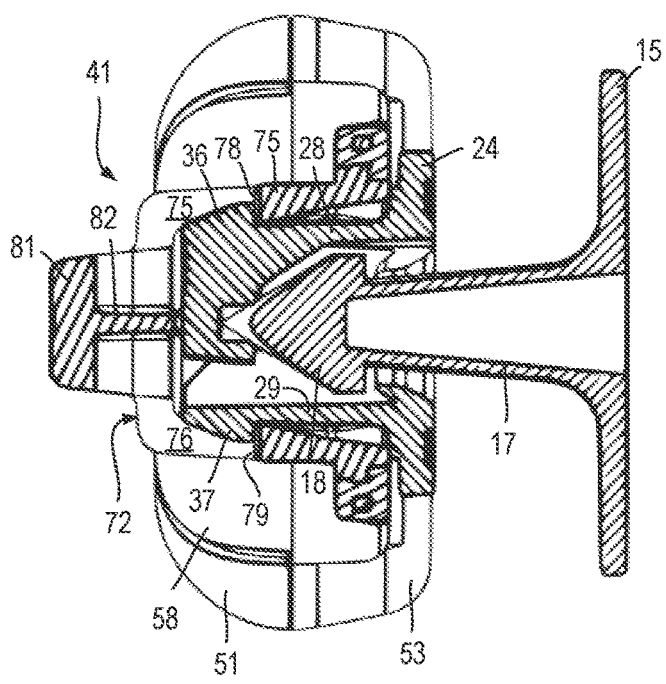
FIG. 22 illustrates a stud cover and a stud after insertion of the stud into the stud cover.

Referring in particular to FIGS. 21 and 22, when the stud 7 is inserted into the stud cover 41, the wedge-like barbs 36, 37 urge against the inside wall 76 of the tube 75 thereby pushing the barbs 36, 37 and the curved side walls 28, 29 carrying them towards each other. This continues until the barbs 36, 37 pass the ends 77, 78 of the notches 75, 76. The curved side walls 28, 29 urge the barbs outwards so that they sit in respective notches 75, 76. Further travel the stud 7 continues until the flange-like annular plate 24 abuts against the end 71 of the tube 75. The stud 7 is unable to be withdrawn since the ends 78, 79 of the notches 75, 78 interfere with (or "abut") the barbs 36, 37.

Figure 23:
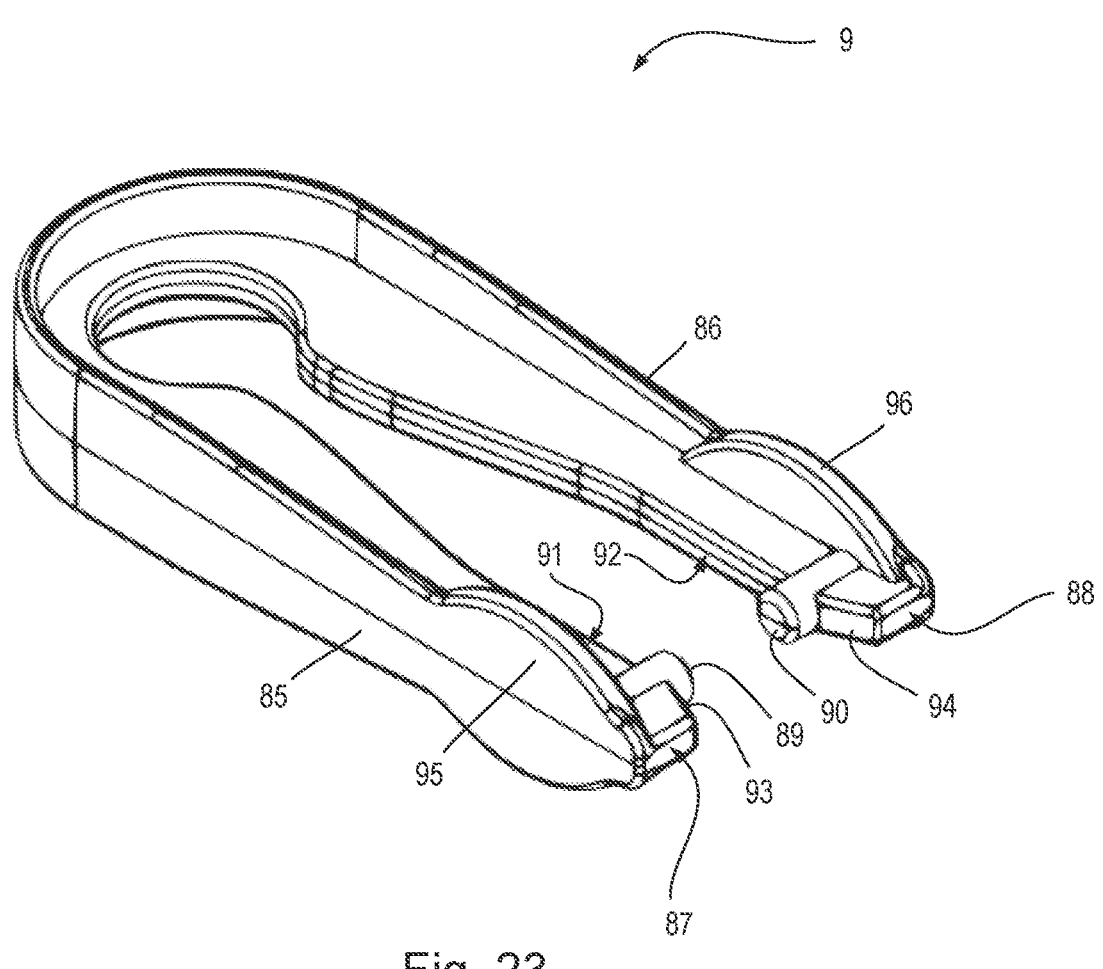
FIG. 23 is a perspective view of a tool for releasing a removeable part of the tag from a stud assembly shown in FIG. 2.

Referring to FIG. 23, a tool 9 for releasing the removeable part 5 is shown.

The tool 9 is generally tongs-shaped with first and second arms 85, 86 having first and second tips 87, 88 (or "distal ends"). The arms 85, 86 are resiliently biased (or "sprung") so that when force that is applied to press together the arms 85, 86 is removed, the arms 85, 86 return to their original positions.

Each arm includes a respective stub 89, 90 which protrude beyond inwardly-facing surfaces 91, 92 of the arms 85, 86 such that the stubs 89, 90 face each other. The stubs 89, 90 are positioned and dimensioned so as to cooperate with the curtain 82 (FIG. 22) to help prevent overtravel, i.e., to help avoid the arms of the tool from being pressed together too closely.

At the end of each respective an arm 85, 86, an inwardly-facing surface 93, 94 (herein referred to as "cap engagement surfaces") lie between the stub 89, 90 and the end 87, 88 of the arm 85, 86 which serve to engage with the outer surface of a respective barb 37, 38 of the cap 7. The cap engagement surfaces 93, 94 slope outwardly towards the ends 87, 88 such that when they engage with the cap 7 not only do they impart inward force to squeeze the walls together, but also they provide forward force so as to help expel the cap 7 from the cap cover 41.

The tool 9 also includes segments 95, 96 upstanding from the arms 85, 86 which can be used to engage the slot 70 (FIG. 17) of the cover 65 of the sensor tag 5.

The tool 9 is made of a suitable hard plastic material, such as a blend of polycarbonate (PC) and acrylonitrile butadiene styrene (ABS).

Figures 24A, 24B, 24C:
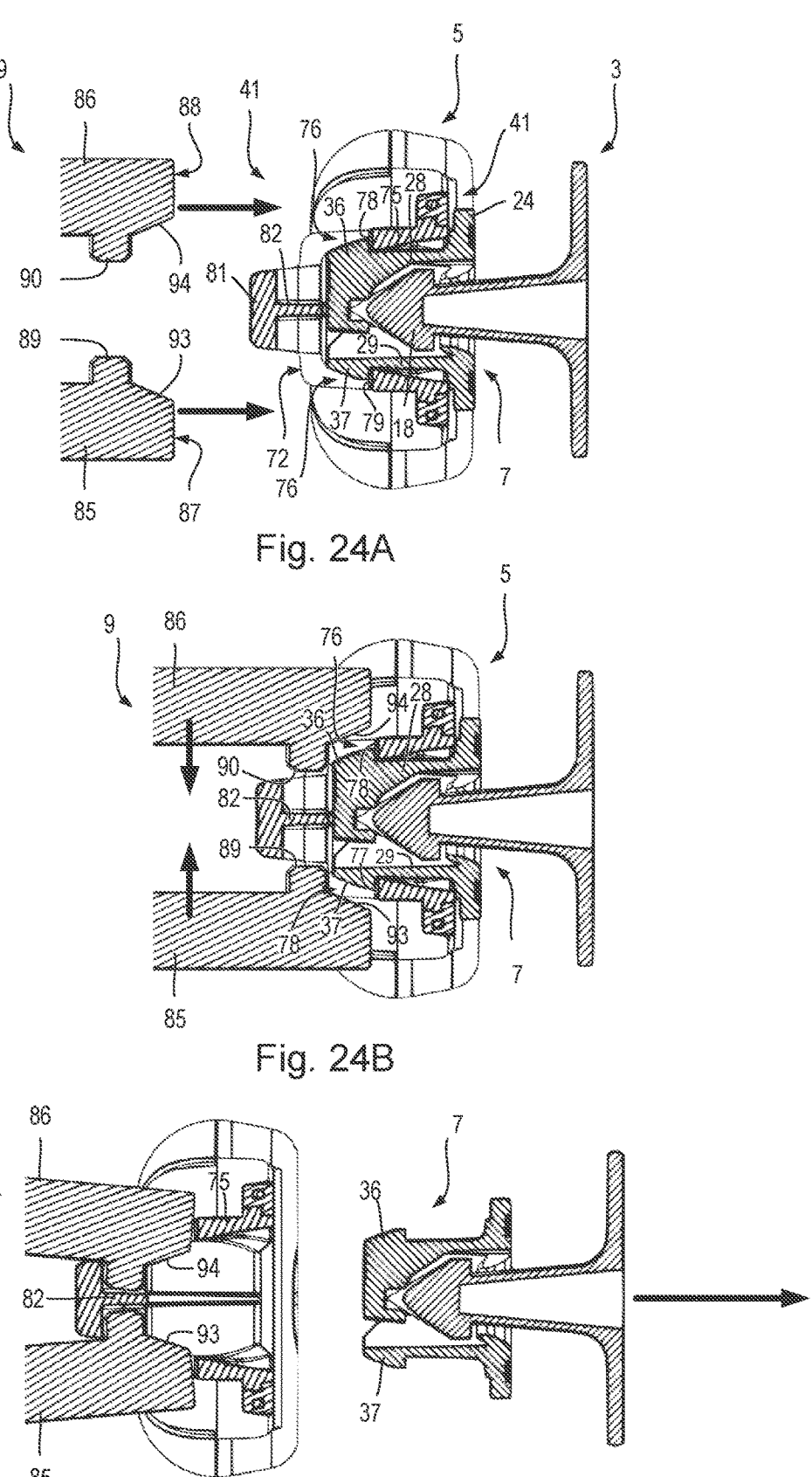
FIG. 24A illustrates the stud cover and the inserted stud shown in FIG. 22 and the tip of the tool shown in FIG. 23.
FIG. 24B illustrates the stud cover and the inserted stud shown in FIG. 22 and the tip of the tool shown in FIG. 23 engaged with the stud cover and the inserted stud.
FIG. 24C illustrates the stud cover and the stud shown in FIG. 24B after the stud has been removed from the stud cover.

Referring to FIGS. 24A to 24C, disengagement of the cap 7 and cap cover 41 is shown.

The tips 87, 88 of the tool 9 are inserted into the top of the cap cover 41, either side of the arch 81 until the stubs 89, 90 lie under the arch 81, as shown in FIG. 24B.

The arms 85, 86 of the tool 9 are squeezed together so that the pair of stubs 89, 90 and the pair of cap engagement surfaces 93, 94 are brought together. The distance between a cap engagement surfaces 93, 94 and a corresponding barb 36, 37 is less than the distance between a stub 89, 90 and the curtain 82. Thus, as the arms 85, 86 of the tool 9 are squeezed together, the cap engagement surfaces 93, 94 engage with the barbs 36, 37 before the stub 89, 90 engages the curtain 82. As the arms 85, 86 of the tool 9 are squeezed together further, the barbs 36, 37 and the walls 28, 29 flex inwardly. The cap engagement surfaces 93, 94 also apply a forward force on the cap 7. Once the barbs 36, 37 and walls 28, 29 flex inwardly sufficiently far to clear the ends 77, 78 of the notches 75, 76, the cap 7 is free to disengage from the cap cover 41. The forward force applied by the engagement surfaces 93, 94 help to eject the cap 7 from the cap cover 41.

Referring again to FIGS. 6 to 14, the stud assembly 3 comprises a stud back 6 carrying a male member 16 (i.e., spike 16) and a stud 7 which provides a female part for seating the spike 16. However, other arrangements can be used.

Referring also to FIGS. 25 to 27, a modified stud 95 is shown which includes a stud back 6' similar to the stud back 6 hereinbefore described (for example in that includes a disc 15' and a spike 16') and a stud 7' similar to the stud 7 hereinbefore described (for example, in that it includes first and second curved side walls 28', 29' supporting first and second barbs 36', 37' respectively).

In the modified stud 95, the stud back 6' and stud 7' are arranged back-to-back extending in opposite directions from respective faces of the disc 15' and are formed in a single piece, for example, from a suitable hard plastic material, such as nylon. The spike 16' may include a hardened tip, in a similar way to that hereinbefore described.

The spike 16' passes through the outer ear and can inseparable snap-fit with a corresponding stud (not shown) to form a stud assembly (not shown) which is permanently attached to the cow. The stud (no shown) may be provided with an identification tag or machine-readable tag (e.g., including an RFID tag) as hereinbefore described. In some embodiments, the modified stud 95 may include the machine-readable tag.

The modified stud 95 may include an RFID unit 96 (or "RFID capsule" or "RFID pill").

Figures 28, 29:
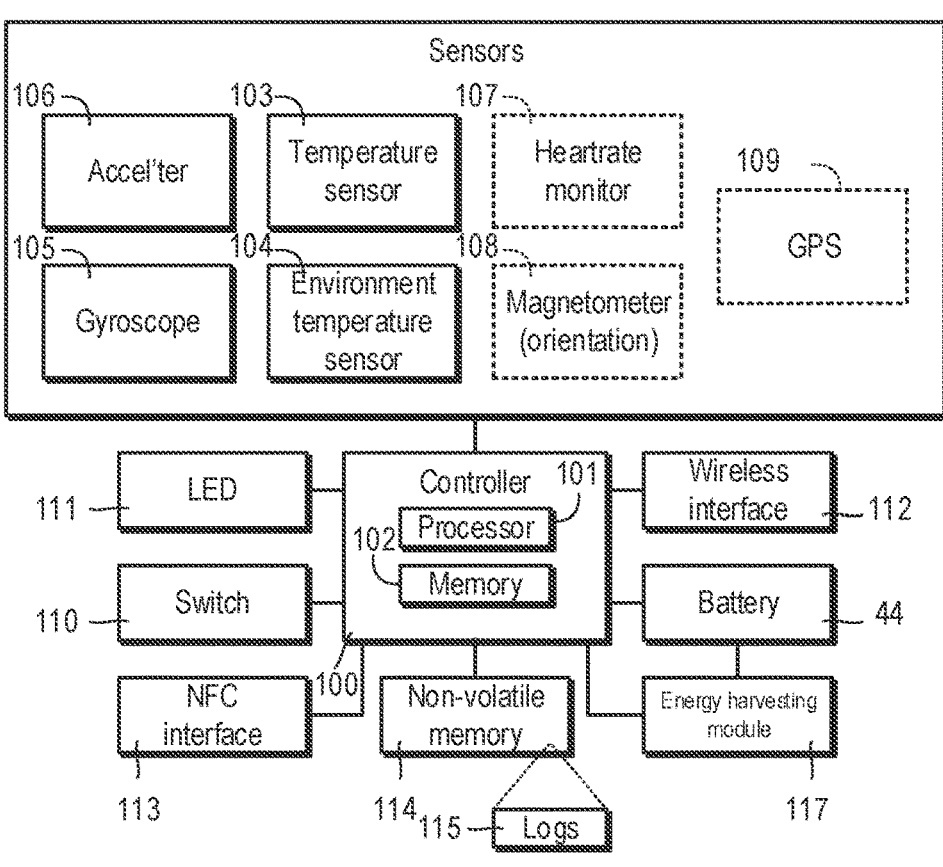
FIG. 28 is a schematic block diagram of a sensor system contained in the sensor tag.
FIG. 29 is a schematic block diagram of functional modules implemented by a controller in the sensor system.

Referring to FIG. 28, the sensor system 43 contained in the removable tag 5 is shown.

The sensor system 43 comprises a controller 100, for example in the form of a microcontroller, which includes a processor 101 and memory 102, and a set of sensors including a temperature sensor 103 for measuring the temperature of the cow 2 via the IR-transparent window 68 (FIG. 17), an environmental temperature sensor 104 for measuring the temperature of the surroundings, an accelerometer 105, a gyroscope 106 and, optionally, a heart rate monitor 107 for measuring heart rate of the cow via the IR-transparent window 68 (FIG. 17), magnetometer 108 for measuring the orientation of the cow and a positioning unit 109, for example, a global position system (GPS) unit. Other sensors can be included, for example, for measuring humidity, volatile gases, dust and the like. The sensor system 43 includes a switch 110 which operated by the push button 53, an LED 110 for indicating an alert (different alerts can be signalled using different patterns of flashes), status or location of the animal, a wireless communications network interface 112 for example in the form of a BlueTooth network interface, an NFC interface 113 and non-volatile memory 114 for storing logged data 115. The sensor system

Figure 30:
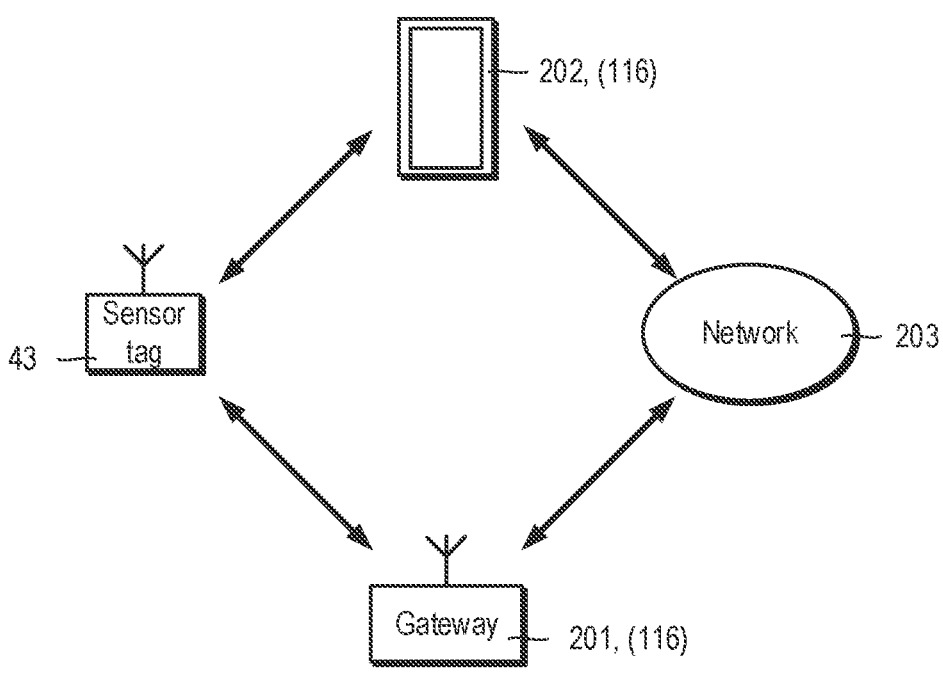
FIG. 30 is a schematic block diagram of a system which includes one or more tags, a gateway, a communications network and a mobile communications device.

43 may retain logged data until it is range of a receiver device 116 (FIG. 30). The sensor system 43 may also include an energy-harvesting module 117.

Referring to FIG. 29, the controller 100 implements several functions or modules 121, 121, 122, 123, 124, 125, 126, 127, 128, 129 in software.

The functions and modules 121, 121, 122, 123, 124, 125, 126, 127, 128, 129 include suitable interfaces 121 for the sensors 101, a monitoring module 121 for gathering and optionally timestamping data, such as temperature of the animal, from the sensors, a logging module 123 for storing measured data in memory 114, a processing module 124 for analysing measured data, and an event or condition identifier 125. The processing module 124 may include a model 130 which can be trained by machine learning algorithm to learn animal behaviour. The model 130 may be used to detect anomalies in animal behaviour The controller 121 includes a communication module 126. As will be explained in more detail hereinafter, the sensor system 43 is able to wirelessly communicate data from the sensors 101 to a receiver device 116 (FIG. 28). The sensor system 43 may also be chirp its current location.

The controller 121 may a self-test module 127 for assessing status and indicating an alert condition, such as faulty operation of a sensor or low battery, a security module 128 for handing encryption, and an over-the-air (OTA) update module 129 for updating the device's firmware.

Referring to FIG. 30, a system 200 is shown which includes one or more sensor tags 43, a gateway 201 (which may be fixed or mobile), a mobile communications device 202 for example, in the form of a smart phone or tablet computer, and a communications network 203. The tag 43 may communication with a receiver device 116 which can be the gateway 201 or the mobile handheld device 202.

The tag 43 may transmit logged data 115 to gateway 201 or mobile communications device 202. For example, the tag 43 may transmit logged data 115 on demand and/or at predefined times. The tag 43 may transmit logged data 115 when the tag 43 and/or other device 201, 202 establishes that the tag and device 201, 202 are able to communicate (sometimes referred to colloquially as being "in range").

The logged data 115 include measurements taken by at least some of the sensors. The data 115 preferably include temperature of the cow, ambient temperature and data relating to movement of the cow. The data 115 can include the heartrate of the cow. The data 115 can include the orientation of the cow, in particular, the cow's head. The data 115 can include the location, e.g., geolocation, of the cow. The data 115 can include other data such as heartrate and orientation.

The logged data 115 can be used to monitor the welfare of the cow, for example, to identify if the cow is ill.

MODIFICATIONS

It will be appreciated that various modifications may be made to the embodiments hereinbefore described. Such modifications may involve equivalent and other features which are already known in the design, manufacture and use of animal tags and component parts thereof and which may be used instead of or in addition to features already described herein. Features of one embodiment may be replaced or supplemented by features of another embodiment.

The stud assembly need not necessarily comprise two separate parts. The stud assembly can take the form of a single-piece clip which may be folded over an edge of, for example, ear, and joined through it.

Although a cow has been described, the tag can be used with other animals, such as a pig, horse or sheep.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A tag for an animal, the tag comprising:
a first part for permanently attaching to a part of an animal, the first part including at least one male mating member having a resilient member supporting a protrusion; and
a second part for removably attaching to the first part, the second part being removable from the first part and including at least one corresponding female mating part configured to snap-fit separably and including a depression for receiving the protrusion, wherein:
the first part and the second part are arranged such that the second part is releasably securable to the first part; and
the at least one male mating member and the at least one corresponding female mating part are configured to snap-fit separably.

2. The tag of claim 1, wherein the first part includes two male mating members and the second part comprises two corresponding female mating parts.

3. The tag of claim 1, further comprising:
a visual identification tag permanently attached to or forming part of the first part for visually and/or human-readably identifying the animal.

4. The tag of claim 1, further comprising:
a machine-readable identification tag for machine-readably identifying the animal, the machine-readable identification tag configured to one or more of be permanently attached to the first part or form part of the first part.

5. The tag of claim 1, wherein the first part comprises:
a stud; and
a stud back;
wherein the stud and stud back are configured to snap-fit inseparably.

6. The tag of claim 5, wherein:
the stud back comprises a base and a spike upstanding from the base, the spike comprising a shaft and an arrow head; and
the stud comprises an annular portion and one or more inwardly-projecting members from the annular portion such that in response to the arrow head passing in a first direction beyond the one or more inwardly-projecting members, the one or more inwardly-projecting members prevent the spike from being withdrawn past the one or more inwardly-projecting members in a second, opposite direction.

7. The tag of claim 1, wherein:
the first part comprises:
an annular base;
first and second facing arcuate walls extending away the annular base; and first and second protrusions extending outwardly laterally; and
the second part comprises:
a tube having first and second slots on opposite sides of the tube for receiving the first and second protrusions.

8. The tag of claim 1, wherein the first part comprises:
first and second resilient members for cooperating with corresponding parts on the second part for releasably securing the second part to the first part, the first and second resilient members arranged such that in response to the first and second resilient members being urged inwardly and sufficiently close together, the first part and the second part are released; and
first and second apertures for receiving first and second correspondingly shaped parts of a tool for inwardly urging the first and second resilient members.

9. The tag of claim 8, wherein the first part comprises:
a wall between the first and second apertures for discouraging or preventing the tool from urging the first and second resilient members too closely.

10. The tag of claim 1, wherein the second part comprises:
a connector for removably attaching the second part to the first part of the tag;
a main tag portion; and
a tab joining the connector and the main tag portion.

11. The tag of claim 10, wherein the tab is formed of a sufficiently flexible material to be bendable such that the main tag portion is bendable through an angle of at least 90 degrees relative to the connector from a first angular position to a second angular position.

12. The tag of claim 10, wherein the main tag portion comprises:
a housing; and
a sensor system and a battery system contained in the housing of the main tag portion, wherein the sensor system includes a temperature sensor for sensing animal temperature and a wireless network interface.

13. The tag of claim 12, wherein the temperature sensor is an infrared sensor and the housing includes a window which is transparent to infrared radiation.

14. The tag of claim 12, wherein the sensor system further includes one or more of:
an accelerometer;
a gyroscope;
a second temperature sensor for sensing ambient temperature;
a heart rate monitor;
a magnetometer;
an energy harvesting unit; or
a positioning unit.

15. A tool comprising:
first and second arms having first and second tips; and
first and second stubs protruding from inwardly-facing surfaces of the first and second arms;
wherein the first and second stubs are positioned and dimensioned so as to engage first and second apertures respectively of a tag for an animal, the tag comprising a first part for permanently attaching to a part of an animal, and a second part that is removable for removably attaching to the first part; wherein the first part and the second part are arranged such that the second part is releasably securable to the first part, and the first part comprises:
first and second resilient members for cooperating with corresponding parts on the second part for releasably securing the second part to the first part, the first and second resilient members arranged such that in response to the first and second resilient members being urged inwardly and sufficiently close together, the first part and the second part are released, and the first and second apertures for receiving first and second correspondingly shaped parts of the tool for inwardly urging the first and second resilient members;

the tool further comprising:

first and second engagement surfaces disposed on the inwardly-facing surfaces of the first and second arms;

wherein the first and second engagement surfaces are positioned and dimensioned so as to engage with the first and second resilient members and to urge the first and second resilient members inwardly.

16. The tool of claim 15, wherein the first and second engagement surfaces slope outwardly towards ends of the first and second arms.

17. A tag for an animal, the tag comprising:

a first part for permanently attaching to a part of an animal, the first part including at least one male mating member having at least one resilient side wall supporting a barb; and a second part for removably attaching to the first part, the second part being removable from the first part and including at least one corresponding female mating part having a side wall including one or more of a slot or a notch for receiving the barb, wherein:

the first part and the second part are arranged for the second part to be releasably securable to the first part; and the at least one male mating member and the at least one corresponding female mating part are configured to snap-fit separably.

\*    \*    \*    \*    \*